United States Patent
Bernard et al.

(10) Patent No.: US 8,560,163 B2
(45) Date of Patent: Oct. 15, 2013

(54) PROCESS AND DEVICE FOR DIAGNOSTIC AND MAINTENANCE OPERATIONS OF AIRCRAFT

(75) Inventors: Denys Bernard, Faudoas (FR); Christophe Bordry, Cugnaux (FR)

(73) Assignee: Airbus Operations S.A.S., Toulouse (FR)

( * ) Notice: Subject to any disclaimer, the term of this patent is extended or adjusted under 35 U.S.C. 154(b) by 625 days.

(21) Appl. No.: 12/366,948

(22) Filed: Feb. 6, 2009

(65) Prior Publication Data

US 2009/0210104 A1 Aug. 20, 2009

(30) Foreign Application Priority Data

Feb. 8, 2008 (FR) .................................. 08 50812

(51) Int. Cl.
 *G06G 7/48* (2006.01)
(52) U.S. Cl.
 USPC ........ 701/30.4; 701/30.5; 701/30.2; 702/185; 702/8; 714/25
(58) Field of Classification Search
 USPC ............. 701/29, 33, 3, 30.4, 29.1, 29.7, 30.2, 701/30.5, 31.4; 702/185, 183; 714/25; 244/75 R
 See application file for complete search history.

(56) References Cited

U.S. PATENT DOCUMENTS

| | | | |
|---|---|---|---|
| 4,943,919 A | | 7/1990 | Aslin et al. |
| 6,725,137 B2 * | | 4/2004 | Eagleton et al. ................ 701/29 |
| 7,702,435 B2 * | | 4/2010 | Pereira et al. ................... 701/29 |
| 7,853,441 B2 * | | 12/2010 | Volponi et al. ..................... 703/7 |
| 7,991,580 B2 * | | 8/2011 | Sambasivan et al. ......... 702/179 |
| 8,121,818 B2 * | | 2/2012 | Gorinevsky .................. 702/183 |
| 8,417,360 B2 * | | 4/2013 | Sustaeta et al. ................. 700/28 |
| 2003/0167111 A1 * | | 9/2003 | Kipersztok et al. ............. 701/29 |
| 2005/0028033 A1 * | | 2/2005 | Kipersztok et al. ............. 714/27 |
| 2006/0142976 A1 * | | 6/2006 | Bonanni et al. ............... 702/189 |
| 2007/0018953 A1 * | | 1/2007 | Kipersztok ................... 345/156 |
| 2008/0065289 A1 * | | 3/2008 | Bertosa et al. .................. 701/29 |
| 2009/0040367 A1 * | | 2/2009 | Zakrzewski et al. .......... 348/370 |
| 2009/0204245 A1 * | | 8/2009 | Sustaeta et al. ................. 700/99 |

FOREIGN PATENT DOCUMENTS

| | | |
|---|---|---|
| EP | 0 739 111 A2 | 10/1996 |
| FR | 2 891 379 A1 | 3/2007 |
| WO | WO 2006/000110 A1 | 1/2006 |

* cited by examiner

*Primary Examiner* — Ronnie Mancho
(74) *Attorney, Agent, or Firm* — Oblon, Spivak, McClelland, Maier & Neustadt, L.L.P.

(57) ABSTRACT

A method and a device for filtering diagnostic messages obtained from a plurality of elements of a system, each of these elements comprising diagnostic means capable of detecting a failure and of transmitting a message comprising at least one failure indication. The state of at least certain elements of the said plurality of elements is represented by a model of state. After at least one failure message has been received, this message is filtered according to the failure indication that it contains and according to the model of state. In response to the filtering step, the model of state is updated according to the failure indication or the message is rejected. The filtering step is advantageously based on a propositional logic mechanism.

13 Claims, 2 Drawing Sheets

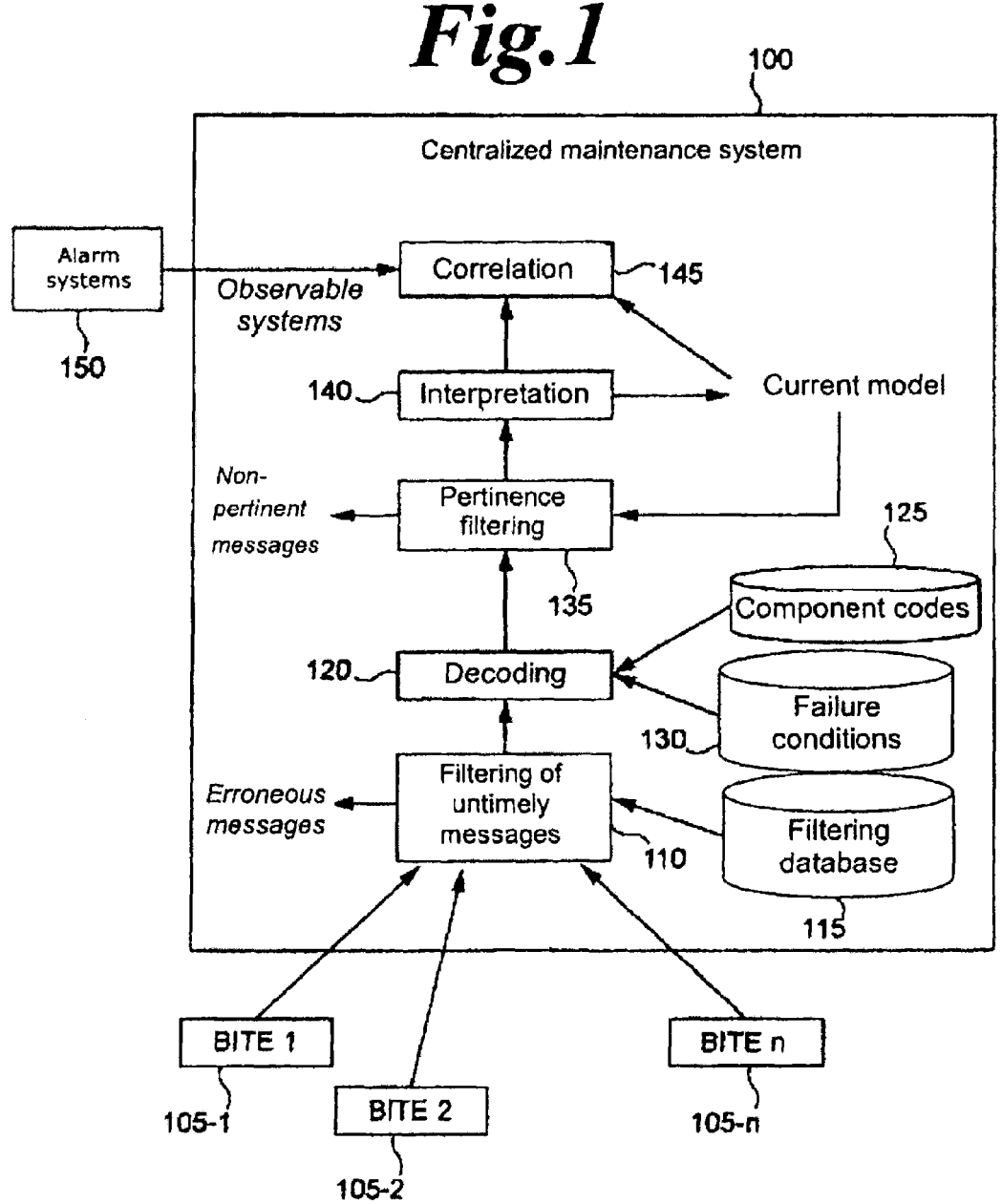

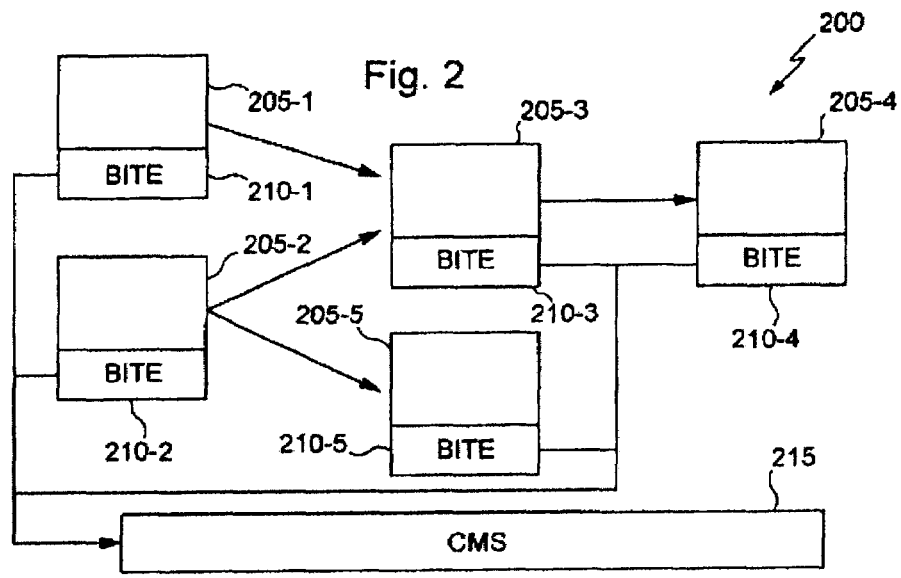
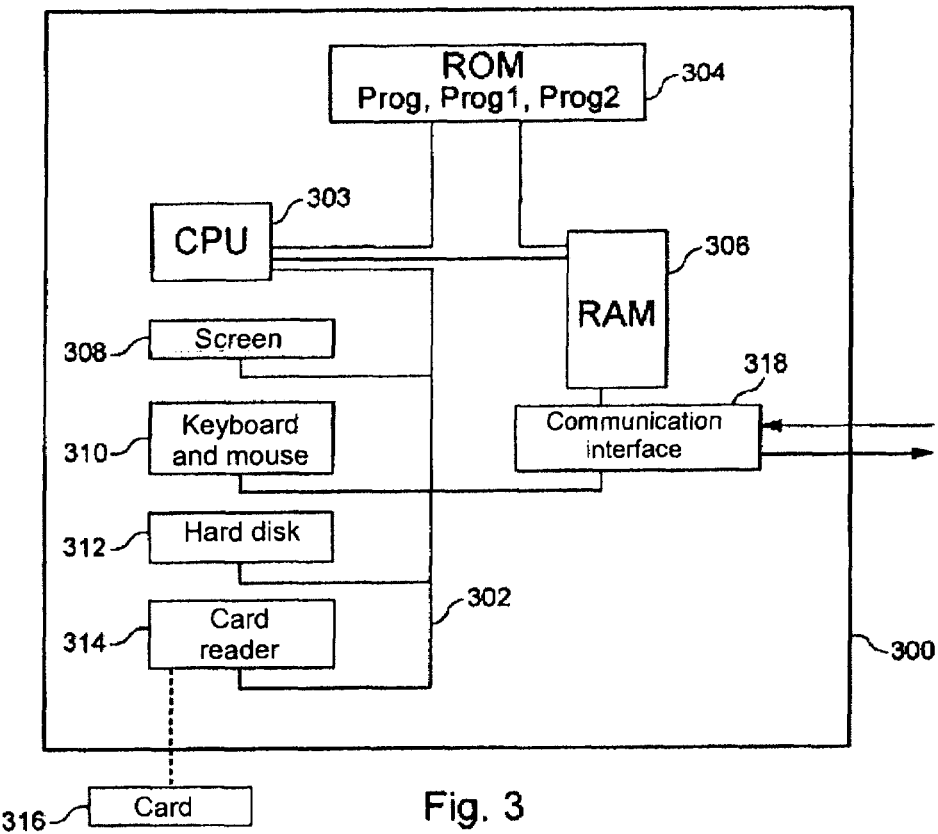

PROCESS AND DEVICE FOR DIAGNOSTIC AND MAINTENANCE OPERATIONS OF AIRCRAFT

TECHNICAL FIELD OF THE INVENTION

The present invention relates in general to maintenance operations on aircraft and more particularly to an improved method and device for diagnostic and maintenance operations capable of efficiently integrating diagnostic data obtained from different elements.

PRIOR ART

First-level maintenance of aircraft, or in other words the entirety of direct interventions (not including shop repairs), primarily comprises corrective actions aimed at replacing or repairing failing aircraft components or components in the course of degradation, scheduled inspections, generally periodic, and preventive actions, such as replacement of equipment items having limited useful life.

The corrective actions are based in particular on knowledge of the state of the aircraft, obtained in particular from crew reports, on-board diagnostic systems and inspections conducted during the scheduled checkups.

The on-board diagnostic systems have a two-level architecture comprising on the one hand a local analysis of the main aircraft systems and on the other hand a centralized analysis with which information items obtained from the local analyses can be integrated.

Thus each major system of an aircraft is provided with an integrated test and diagnostic equipment item known as BITE (acronym for Built-In Test Equipment in English terminology), which detects abnormal events, confirms them and formulates a local diagnosis. These information items are transmitted to a centralized maintenance system known as CMS (initials for Centralized Maintenance System in English terminology), which filters these data and correlates them.

In modern architectures, the results of the diagnosis formulated by the integrated test and diagnostic equipment item are generally suggestions, or in other words indications of detected or potential failures expressed in logical form. The logical formulas used comprise one or more references to components, especially replaceable components such as LRUs (initials for Line Replaceable Unit in English terminology). If reference is made to several components, these are generally connected by logical operators such as AND and OR, making it possible to provide an indication about the failing or potentially failing component or components. For example, the expression "ISOL VALVE-CAX, AFT (310HU2)/CTL MODULE-VENT AFT(102HG1)" indicates that a valve or a control module is in breakdown.

In some maintenance architectures, the diagnostic results are transmitted in full by the integrated test and diagnostic equipment items. In other architectures, only a code is transmitted to the centralized maintenance system. A knowledge base of failures is then used, in order to formulate the possible diagnosis or diagnoses for the detected event at the central level.

The diagnostic results transmitted by the integrated test and diagnostic equipment items, generally in the form of messages, are often dated (by the BITES or by the CMS): each message is associated with a date of appearance and if applicable with a date of disappearance. In a traditional scenario, the date of appearance of the message is slightly later than the date of occurrence of the breakdown, and the date of disappearance corresponds to the date of repair of the breakdown.

To limit the number of messages to be processed, the messages received by the centralized maintenance system may be filtered. The filtering operations performed today by the centralized maintenance system generally consist in suppressing untimely messages, considered to be unreliable. The filtering is based in particular on the type of failure detected and on the flight phase.

In addition, there is employed a correlation consisting in grouping the messages related to the same cause and in relating the maintenance messages to the symptoms observed by the pilots.

However, because the diagnostic assistance systems are increasingly interconnected and becoming increasingly complex, correlation is becoming increasingly difficult. For example, a given breakdown may be observed by numerous integrated test and diagnostic equipment items.

In addition, by virtue of the proliferation of transducers used, the complexity of the measures taken and the increase of calculating powers, the number and variety of messages generated by the integrated test and diagnostic equipment items have greatly increased. Consequently, although the diagnostics can be refined, they are more difficult to understand.

Thus, despite the functions of filtering out untimely messages, the correlation functions must consider a large number of messages, posing performance problems.

The invention makes it possible to solve at least one of the problems mentioned in the foregoing.

OBJECT OF THE INVENTION

The object of the invention is therefore a method for filtering diagnostic messages in a system comprising a plurality of elements, each element of the said plurality of elements comprising diagnostic means capable of detecting a failure and of transmitting a message comprising at least one indication pertaining to at least one detected failure, the state of at least certain elements of the said plurality of elements being represented by a model of state, this method comprising the following steps, receiving at least one failure message;
filtering the said at least one received message according to the said at least one indication that pertains to the said at least one detected failure, contained in the said at least one received message and according to the said model of state; and,
in response to the said filtering step,
updating the said model of state according to the said at least one indication that pertains to the said at least one detected failure contained in the said at least one received message; or,
rejecting the said at least one received message.

In this way the method according to the invention makes it possible to filter out the received messages considered to be valid but that have contents judged to be non-pertinent.

According to a particular embodiment, at least one of the said failure messages additionally comprises at least one indication pertaining to the instant at which the corresponding failure was detected or occurred, the said filtering step taking into account the said at least one indication pertaining to the said instant.

In this way the method according to the invention makes it possible to filter the received messages more precisely, by taking into account the nature of the detected failure and the instant at which it was detected or the instant at which it occurred.

Advantageously, one step of the said filtering step consists in determining if the said at least one indication that pertains to the said at least one detected failure, contained in the said at least one received message, is at least implicitly contained in the said model of state. In this way a message is considered to be pertinent if it contains an information item that is not explicitly contained in the model of state or that cannot be derived therefrom.

Preferably, the said model of state is represented at least partly in the form of a logical combination of indications pertaining to at least one detected failure, and the said filtering step employs a propositional logic mechanism.

Advantageously, the said at least one received message comprises at least one reference to the element that transmitted the said at least one received message, and the said filtering step comprises a step of analyzing the said at least one received message to determine the validity of the said received message, the said analysis step being based on the said at least one reference and on at least one parameter of the said system. In this way, the method according to the invention makes it possible to filter out the invalid messages and the non-pertinent messages.

According to another particular embodiment, the method additionally comprises a step of decoding the said received messages, the said decoding step being capable of decoding the said at least one indication pertaining to at least one failure detected in the said at least one received message into a failure indication that can be used by the said filtering step.

Advantageously, the method additionally comprises a step of correlating the information items of the said model of state that itself preferably comprises a step of correlating the information items of the said model of state with data obtained from an alarm system.

Another object of the invention is a device comprising means capable of employing each of the steps of the method described in the foregoing as well as an aircraft comprising such a device.

BRIEF DESCRIPTION OF THE DRAWINGS

Other advantages, objectives and characteristics of the present invention become apparent from the detailed description provided hereinafter by way of non-limitative example, with reference to the attached drawings, wherein:

FIG. 1 illustrates an example of an architecture of a centralized maintenance system capable of employing a method according to the invention for evaluating a criterion of pertinence of maintenance messages;

FIG. 2 illustrates an example of a simplified architecture of a system formed from a plurality of elements, an integrated test and diagnostic equipment item being associated with each of these elements, and a centralized maintenance system, to which there are connected all of the integrated test and diagnostic equipment items; and FIG. 3 shows an example of a device with which the invention can be implemented at least in part.

DETAILED DESCRIPTION OF THE INVENTION

In the description hereinafter, the following propositional logic operators are used,
 ˆ represents the conjunction "and";
 v represents the disjunction "or"; and
 ⇒ represents the material implication.

The propositions are represented by upper-case letters (A, B, . . . ), with indices if necessary. The lower-case letters (t, u, . . . ) represent instants. The time intervals are denoted by the letters I and J, with indices if necessary.

The messages transmitted by the integrated test and diagnostic equipment items have the form here of (F, I), where F is a logical proposition that may be true or false at each instant and I is a time interval. The message (F, I) means that: "F is true for every instant t belonging to the interval I (t ∈I)".

According to the invention, all the messages that do not provide any supplementary information are filtered according to the following logico-temporal reasoning principle by considering that the information items $(F_1, I_1), (F_2, I_2), \ldots, (F_n, I_n)$ have been previously received. The message (F, I) is considered to be non-pertinent if it is a logical implication of other received messages. Thus the message (F, I) is categorically disregarded if, $\forall t \in I, \exists \{(G_1, J_1), \ldots, (G_k, J_k)\} \subseteq \{(F_1, I_1), \ldots (F_n, I_n)\}$ such that $t \in J_1 \cap \ldots \cap J_k$ and $G_1 \hat{} \ldots \hat{} G_k \Rightarrow F$ In other words, regardless of the instant t belonging to I, there exist messages $(G_i, J_i)$ included in the list of messages $(F_j, I_j)$ such that the instant t belongs to the union of intervals $J_j$ and such that the set of propositions $G_i$ implies the proposition F.

In fact, according to the preceding relationship, knowledge of the new information item (F, I) does not furnish any supplementary information item at any instant of the interval under consideration.

FIG. 1 illustrates an example of an architecture of a centralized maintenance system 100 capable of employing a method according to the invention to evaluate a criterion of pertinence in the particular case of maintenance messages.

Centralized maintenance system 100, implemented in an aircraft (not illustrated), is connected to a plurality of integrated test and diagnostic equipment items 105-1 to 105-n, in turn associated with the main systems of the aircraft.

More precisely, each integrated test and diagnostic equipment item, denoted generically as 105, is connected to a module 110 for filtering out untimely messages of centralized maintenance system 100.

Filtering of untimely messages is aimed at suppressing certain messages obtained from particular integrated test and diagnostic equipment items during certain predetermined flight phases. Filtering is achieved here in traditional manner by means of a filtering database 115.

The messages considered to be erroneous are suppressed, while the messages considered to be valid are transmitted to a decoding module 120. The messages considered to be valid are said to be exact, meaning that the signaled failures actually have occurred a priori and that the cited reasons are assumed to be correct. Alternatively, the messages considered to be erroneous may be stored in memory in a local database for subsequent analysis, and may be disregarded by the centralized maintenance system.

Decoding module 120 makes it possible to clarify the codes received in the messages emitted by the integrated test and diagnostic equipment items. In fact, for the purpose of conciseness, the references of the components are not cited in their entirety in the messages. Codes known as component codes are used. In general, the failure conditions are also replaced by references in the messages.

Thus the received codes may be of two types: the code components for identification of components, and the codes representing references to predefined failure conditions. In this case the component codes are stored in memory in a database 125, while the failure conditions and their references are stored in memory in a database 130.

It nevertheless should be noted that, in complementary or alternative manner, the failure conditions may be transmitted directly in the messages. Similarly, the component codes may be replaced or supplemented by a description of the components.

Decoding module 120 therefore makes it possible to replace the codes used in the messages by the component references and by the failure conditions.

The messages decoded in decoding module 120 are transmitted to pertinence filtering module 135, which is capable of detecting the messages that do not furnish any new information pertaining to the state of the system, thus ensuring that such messages are not taken into consideration.

The current state of the system, stored in memory in the centralized maintenance system, is defined by a current model of state, which results from knowledge obtained from received messages and accumulated in the course of time. The current model of state, referred to as current model, is advantageously constructed with an interpretation function that incorporates, in the current model, all messages considered to be true and pertinent.

Thus, to determine if a message is pertinent, the pertinence filtering module compares the contents of the messages received and decoded with the current model.

The non-pertinent messages are suppressed or stored in memory in a local database for subsequent analysis, and disregarded by the centralized maintenance system.

The pertinent messages, used by an interpretation module 140 to update the current model, are transmitted to a correlation module 145.

Correlation module 145 is capable of grouping the maintenance messages resulting from identical causes. Correlation module 145 is also capable of associating the maintenance messages with the observable symptoms reported by an alarm system 150 with the aid of predetermined rules.

It should be noted here that the object of on-line maintenance systems is essentially to diagnose the problems reported by the crew. This is the reason why the maintenance messages are correlated with the observable symptoms, such as the alarms and the indications displayed in the cockpit.

Module 110 for filtering untimely messages, decoding module 120 and correlation module 145 are advantageously the modules commonly used in aircraft currently in service.

Consequently, the present description is aimed mainly at pertinence filtering module 135 and interpretation module 140 as well as at the combination of these modules with module 110 for filtering untimely messages, decoding module 120 and correlation module 145.

As indicated in the foregoing, a maintenance information item is advantageously an affirmation of a failure condition of an aircraft component during a time interval. The following structure, using the BNF notation (initials for Backus-Naur Form in English terminology), may be used to represent the maintenance information items,

```
<maintenance information> ::= "(" <failure condition>
"," <interval> ")"
<failure condition> ::=
    <elementary failure>
    | "(" <failure condition> ")"
    | <failure condition> "∨" <elementary failure>
    | <failure condition> "∧" <elementary failure>
<elementary failure> ::=
<component breakdown>
    | <abnormal operational condition>
```

-continued

```
<component breakdown> ::= unambiguous valid name of component
of the aircraft
<abnormal operational condition> ::= state
<interval> ::= "[" <instant> "," <instant> "["
<instant> ::= unambiguous valid notation of date and time
```

Thus, according to this example, a failure condition is determined by a rule applicable to a combination of elementary failure conditions, each elementary failure being determined by the state of one component. A time interval is defined here by two instants corresponding to the start and end of the interval.

According to a particular embodiment, the current model is composed of an ascending sequence of instants $t_1$ to $t_n$ and of a set of information items conforming with the foregoing syntax, defined over each interval formed from two consecutive instants. In other words, the model contains a logical formula describing the state of the system for each interval $[t_n, t_{n+1}[$.

Thus the current model, denoted by M, may be expressed as follows, $$M = (\{t_1, \ldots, t_n\}, \{F_1, \ldots, F_{n-1}\})$$

such that the instants $t_i$ form an ascending sequence of instants and that the information item $(F_i, [t_i, t_{i+1}[)$ is a true maintenance information item.

It is assumed here that the function $\mathrm{mod}(M, t)$, defined over the interval $[t_1, t_n[$, makes it possible to determine the true information item at the instant t according to the current model M. Thus, if the instant t falls between the instants $t_i$ and $t_{i+1}$, then the function $\mathrm{mod}(M, t)$ makes it possible to determine the information item $F_i$ ($t_i \le t < t_{i+1} \Rightarrow \mathrm{mod}(M, t) = F_i$).

According to another particular embodiment, the criterion for pertinence of a new message is evaluated in the following manner. While retaining the hypothesis wherein the current model is defined by $M = (\{t_1, \ldots, t_n\}, \{F_1, \ldots, F_{n-1}\})$, and supposing that the information item of the message whose pertinence is being evaluated is $(F_u, [u_1, u_2[)$, the information item $(F_u, [u_1, u_2[)$ is considered to be non-pertinent if and only if the interval $[u_1, u_2[$ is included in the interval $[t_1, t_2[$ and if the function $\mathrm{mod}(M, t)$ allows the information item $F_u$ to be determined for every instant t belonging to the interval $[u_1, u_2[$. Such a criterion can be formulated in the following way, $[u_1, u_2[ \subset [t_1, t_n[$ and $\forall [t_i, t_{i+1}[$ such that $[t_i, t_{i+1}[ \cap [u_1, u_2[ \ne \emptyset$ then $F_1 \Rightarrow F_u$ In other words, the interval covered by the new message is already covered by the current model, and the information item carried by the new message is a consequence of the current model, for each instant of the interval covered by the new message.

An important advantage of this criterion is related to the combinatorial aspect. In fact, the calculating time necessary for estimation of the pertinence criterion is proportional to the number of intervals contained in the current model. In addition, it is simple to employ, since it is based on a demonstrator of theorems in standard propositional logic.

The procedure for updating the current model $M = (\{t_1, \ldots, t_n\}, \{F_1, \ldots, F_{n-1}\})$ when a new pertinent information item $(F_u, [u_1, u_2[)$ is received consists in constructing a current model M'. It is supposed that $t_i < u_1 < t_{i+1}$ and $t_j < u_2 < t_{j+2}$. The current model M' is constructed such that, if $t \notin [u_1, u_2[$, $\mathrm{mod}(M', t) = \mathrm{mod}(M, t)$ if $t \in [u_1, u_2[$, $\mathrm{mod}(M', t) = \mathrm{mod}(M, t) \wedge F_u$ These conditions are satisfied by the following current model, whose sequence of reference instants was obtained by inserting $u_1$ and $u_2$ into the sequence of instants of the initial model, $M'=(\{t_1, \ldots, t_i, u_1, t_{i+1}, \ldots, t_j, u_2, t_{j+1}, \ldots, t_n\},$
$\{F_1, \ldots, F_i, F_i \hat{} F_u, F_{i+1} \hat{} F_u, \ldots, F_j, F_j \hat{} F_u, F_j, F_{j+1}, \ldots, F_n\})$ It should be noted here that the particular cases in which $u_1$ and/or $u_2$ are outside the interval $[t_1, t_n[$ or coincide with one of the instants $t_k$ are deduced directly from the general case presented in the foregoing.

FIG. 2 illustrates an example of a simplified architecture 200 of a system formed from a plurality of elements 205-1 to 205-5, an integrated test and diagnostic equipment item 210-1 to 210-5 being associated with each of these elements. All integrated test and diagnostic equipment items 210-1 to 210-5 are connected to a centralized maintenance system 215.

Elements 205-1 to 205-5 are functionally connected to one another. For example, element 205-1, referenced 'A', is functionally connected to element 205-3, referenced 'C', which itself is functionally connected to element 205-4, referenced 'D'. Element 205-2, referenced 'B', is functionally connected here to element 205-3 as well as to element 205-5, referenced 'E'.

By way of illustration, it is supposed here that element B is failing at the instant t=1. A failure is detected by element D at the instant t=5, by element E at the instant t=10 and then by element C at the instant t=15.

At the instant t=0, no message has been received by centralized maintenance system 215. Consequently the current model is empty.

At the instant t=5, integrated test and diagnostic equipment item 210-4 associated with element 205-4 detects a failure. It then transmits a message to centralized maintenance system 215 indicating that at least one element connected upstream of element 205-4 is failing. By virtue of rules contained in this element, it is capable of stating that the failure is related to element A, to element B or to element C. The message transmitted by integrated test and diagnostic equipment item 210-4 to centralized maintenance system 215 is therefore representative of the information item (A v B v C, [5, +∞[). Since this information item is considered to be pertinent, it is added to the current model, which can then be represented in the form M=({5, +∞}, {A v B v C}).

At the instant t=10, integrated test and diagnostic equipment item 210-5 associated with element 205-5 detects a failure. It then transmits a message to centralized maintenance system 215 indicating that at least one element connected upstream of the element is failing. By virtue of rules contained in integrated test and diagnostic equipment item 210-5, it is capable of stating that the failure is related to element B. The message transmitted by integrated test and diagnostic equipment item 210-5 to centralized maintenance system 215 is therefore representative of the information item (B, [10, +∞[). Since this information item is considered to be pertinent, it is added to the current model, which can then be represented in the form M=({5, 10, +∞}, {A v B v C, B}).

At the instant t=15, integrated test and diagnostic equipment item 210-3 associated with element 205-3 detects a failure. It then transmits a message to centralized maintenance system 215 indicating that at least one element connected upstream of element 205-3 is failing. By virtue of rules contained in this element, it is capable of stating that the failure is related to element A or to element B. The message transmitted by integrated test and diagnostic equipment item 210-3 to centralized maintenance system 215 is therefore representative of the information item (A v B, [15, +∞). This information item is not considered to be pertinent, since it does not add any information to the current model. The current model is therefore not modified by the message received from integrated test and diagnostic equipment item 210-3.

It may be noted that the example uses intervals open to the right, meaning that the associated logical formula is true up to the current instant.

The following table summarizes the evolution of the system represented in FIG. 2 according to the hypotheses formulated in the foregoing,

| Time | Detector | New information item | Current model |
| --- | --- | --- | --- |
| 0 | | | { }, { } |
| 5 | D | A v B v C, [5, +∞[ | {5, +∞}, {A v B v C} |
| 10 | E | B, [10, +∞[ | {5, 10, +∞}, {A v B v C, B} |
| 15 | C | A v B, [15, +∞[ | {5, 10, +∞}, {A v B v C, B} |

A device capable of employing the invention or part of the invention is illustrated in FIG. 3. Device 300 is, for example, a calculator or a microcomputer.

In the present case, device 300 is provided with a communication bus 302, to which there are connected:
- a central processing unit or microprocessor 303 (CPU, Central Processing Unit);
- a permanent memory 304 (ROM, acronym for Read Only Memory in English terminology), which may be provided with the programs "Prog", "Prog1" and "Prog2";
- a volatile memory or cache memory 306 (RAM, acronym for Random Access Memory in English terminology), provided with registers capable of recording the variables and parameters created and modified in the course of execution of the aforesaid programs; and,
- a communication interface 318, capable of transmitting and receiving data.

Optionally, device 300 may also be provided with:
- a screen 308, for visualizing data and/or for acting as a graphical interface with the user, who will be able to interact with the programs according to the invention, by means of a keyboard and of a mouse 310, or of another pointing device, a touch screen or a remote controller;
- a hard disk 312, which can be loaded with the aforesaid programs "Prog", "Prog1" and "Prog2" and with processed data or data to be processed according to the invention; and
- a memory card reader 314 adapted to receive a memory card 316 and to read or write therein processed data or data to be processed according to the invention.

The communication bus permits communication and interoperability between the different elements included in device 300 or connected thereto. The representation of the bus is not limitative and, in particular, the central unit is capable of communicating instructions to any element of device 300 directly or via another element of device 300.

The executable code that in each program permits the programmable device to employ the processes according to the invention may be stored, for example, on hard disk 312 or in read-only memory 304.

According to one variant, memory card 316 may contain data, especially encryption keys, as well as the executable code of the aforesaid programs, which code is stored on hard disk 312 once it has been read by device 300.

According to another variant, it will be possible for the executable code of the programs to be received at least partly via interface 318 to be stored in a manner identical to that described in the foregoing.

More generally, it will be possible for the program or programs to be loaded into one of the storage means of device 300 before being executed.

Central unit 303 will command and direct the execution of the instructions or portions of software code of the program or programs according to the invention, which instructions are stored on hard disk 312 or in read-only memory 304 or else in the other aforesaid storage elements. During boot-up, the program or programs that is or are stored in a non-volatile memory, such as hard disk 312 or read-only memory 304, are transferred into random-access memory 306, which then contains the executable code of the program or programs according to the invention as well as registers for storing in memory the variables and parameters necessary for employment of the invention.

It should be noted that the communication apparatus containing the device according to the invention may also be a programmed apparatus. This apparatus then contains the code of the computer program or programs resident, for example, in an application-specific integrated circuit (ASIC).

Naturally, to satisfy specific needs, a person skilled in the field of the invention will be able to apply modifications in the foregoing description. In particular, although the invention has been presented more particularly in the field of aircraft, it should be noted that it can be employed more generally in numerous similar technical areas, especially in motor vehicles and watercraft.

The invention claimed is:

1. A method for filtering diagnostic messages in a system including a processor and a plurality of elements, each element of the plurality of elements includes a diagnostic unit configured to detect a failure and to transmit at least one message including at least one indication pertaining to at least one detected failure, the state of at least certain elements of the plurality of elements being represented by a model of current state of the system, the method comprising:

receiving, by a centralized maintenance system, the at least one message;

filtering, with the processor, the at least one received message according to the at least one indication that pertains to the at least one detected failure, contained in the at least one received message and according to the model of the current state of the system; and in response to the filtering step:

updating the model of the current state of the system according to the at least one indication that pertains to the at least one detected failure contained in the at least one received message; and rejecting the at least one received message, if the at least one received message is determined to be erroneous by the filtering step performed by the processor.

2. The method according to claim 1, wherein at least one of the messages additionally includes at least one indication pertaining to the instant at which the corresponding failure was detected or occurred, the filtering step taking into account the at least one indication pertaining to the instant.

3. The method according to claim 1, wherein one step of the filtering step consists of determining if the at least one indication that pertains to the at least one detected failure, contained in the at least one received message, is at least implicitly contained in the model of the current state of the system.

4. The method according to claim 1, wherein the model of the current state is represented at least partly in the form of a logical combination of indications pertaining to at least one detected failure, and wherein the filtering step employs a propositional logic mechanism.

5. The method according to claim 1, wherein the at least one received message includes at least one reference to the element that transmitted the at least one received message, and wherein the filtering step includes a step of analyzing the at least one received message to determine the validity of the received message, the analysis step being based on the at least one reference and on at least one parameter of the system.

6. The method according to claim 1, additionally comprising a step of decoding the received messages, the decoding step decoding the at least one indication pertaining to at least one failure detected in the at least one received message into a failure indication that can be used by the filtering step.

7. The method according to claim 1, additionally comprising a step of correlating information items of the model of the current state of the system.

8. The method according to claim 7, wherein the correlation step includes a step of correlating the information items of the model of the current state of the system with data obtained from an alarm system.

9. A device comprising means capable of employing each of the steps of the method according to any one of the preceding claims.

10. An aircraft comprising the device according to claim 9.

11. The method according to claim 1, wherein received messages determined to be erroneous are stored in a memory of a database for subsequent analysis.

12. The method according to claim 1, wherein untimely messages are filtered out and not considered.

13. The method according to claim 1, wherein messages that do not furnish any new information about the system are filtered out and not considered.

* * * * *